United States Patent [19]

Woodruff

[11] 4,209,538
[45] Jun. 24, 1980

[54] METHOD FOR INHIBITING FUNGI IN CITRUS FRUIT

[75] Inventor: Richard E. Woodruff, Salinas, Calif.

[73] Assignee: TransFRESH Corporation, Salinas, Calif.

[21] Appl. No.: 18,946

[22] Filed: Mar. 9, 1979

Related U.S. Application Data

[63] Continuation of Ser. No. 784,527, Apr. 4, 1927, abandoned, which is a continuation-in-part of Ser. No. 715,291, Aug. 18, 1976, abandoned.

[51] Int. Cl.$^2$ .............................................. A23B 7/00
[52] U.S. Cl. ...................................... 426/314; 426/320; 426/333; 426/335; 426/419; 426/616
[58] Field of Search ............... 426/263, 270, 312, 314, 426/316, 320, 333, 335, 616, 654, 418, 419, 442, 524; 62/78; 34/36; 422/28, 32, 40

[56] References Cited

U.S. PATENT DOCUMENTS

| | | | |
|---|---|---|---|
| Re. 14,489 | 6/1918 | Franks | 426/486 X |
| 226,094 | 3/1880 | Mefford | 426/419 |
| 1,017,144 | 2/1912 | Gironcoli | 426/312 X |
| 1,155,530 | 10/1915 | Wahl | 426/312 |
| 1,578,218 | 3/1926 | Thompson | 426/419 |
| 2,079,304 | 5/1937 | Polderman | 426/419 |
| 2,490,951 | 12/1949 | Dunkley | 426/314 |
| 2,930,704 | 3/1960 | Williams | 426/316 X |
| 2,955,940 | 10/1960 | Williams | 426/314 |
| 3,102,777 | 9/1963 | Bedrosian et al. | 21/58 |
| 3,107,171 | 10/1963 | Robinson | 426/419 X |
| 3,453,119 | 7/1969 | McGill | 426/320 X |
| 3,469,947 | 9/1969 | Drury | 21/58 X |
| 3,507,667 | 4/1970 | Magnen | 426/419 |
| 3,563,757 | 2/1971 | Dixon | 99/472 |
| 3,851,080 | 11/1974 | Lugg et al. | 426/312 |
| 3,930,040 | 12/1975 | Woodruff | 426/312 |

FOREIGN PATENT DOCUMENTS

457888 12/1936 United Kingdom .
476272 12/1937 United Kingdom .
715351 9/1954 United Kingdom .

OTHER PUBLICATIONS

Grierson et al., "Controlled Atmosphere Storage of Florida and California Lemons," 88 ASHS, 6–1966, pp. 311–318; 426–419.
Harding, "Effect of Low $O_2$ and Low $CO_2$ Combination in Controlled Atmosphere Storage of Lemons, Grapefruit & Oranges", 53 Plant Disease Reporter, No. 7, 7–1969.
Wild et al., "Effect of Reduced Ethylene Levels in Storage Atmospheres on Lemon Keeping Quality," 11(2), Hort. Science 114 (1976).
Besser et al., "Change in Quality & Nutritional Composition of Foods Preserved by Gas Exchange," 37 Journal of Food Science, pp. 820–823 (1972).

*Primary Examiner*—Arthur L. Corbin
*Attorney, Agent, or Firm*—Kendrick, Netter & Bennett

[57] ABSTRACT

The storage life of citrus fruit, such as lemons, oranges and grapefruit, is extended and their resistance to deterioration upon exposure to air is improved by subjecting them to controlled or modified atmospheres (CA) consisting essentially of carbon dioxide, carbon monoxide, oxygen and nitrogen.

6 Claims, No Drawings

METHOD FOR INHIBITING FUNGI IN CITRUS FRUIT

This is a continuation, of application Ser. No. 784,527, filed Apr. 4, 1977, now abandoned, which is a continuation-in-part of 715,291 of 8/18/26, abandoned.

This invention relates to a method for improving the deterioration resistance of citrus fruit such as oranges, grapefruit and lemons during storage and upon exposure to air.

The prior art is replete with discussions about the effects of modified atmospheres upon the shelf life of fruits, vegetables, flowers and meats. See, for example, British Pat. Nos. 457,888; 476;272 and 715,351; U.S. Pat. Nos. Re 14,489; 226,094; 1,017,144; 1,155,530; 1,578,218; 2,079,304; 2,490,951; 2,930,704; 2,955,940; 3,102,777; 3,107,171; 3,453,119; 3,469,947; 3,507,667; 3,851,080; and 3,930,040; and P. Harding, Jr., Effect of Low Oxygen and Low Carbon Dioxide Combination in Controlled Atmosphere Storage of Lemons, Grapefruit and Oranges, 53 Plant Disease Reporter, No. 7, July, 1969; W. Grierson, et al., Controlled Atmosphere Storage of Florida and California Lemons, 88 American Society for Horticultural Science, 311 (1966) (hereafter Grierson, et al); B. Wild, W. McGlasson and T. Lee, Effect of Reduced Ethylene Levels in Storage Atmospheres on Lemon Keeping Quality, 11(2) HortScience 114 (1976); and T. Besser and A. Kramer, Change in Quality and Nutritional Composition of Foods Preserved by Gas Exchange, 37 Journal of Food Science, pp. 820-823 (1972).

U.S. Pat. No. 3,102,777 discloses that the physiological degradation of stored plant materials releases energy by consuming oxygen and releasing carbon dioxide and water. To retard this degradation, the storage atmosphere generally contains less oxygen, and more carbon dioxide, by volume, than air contains. In particular, this patent calls for a volume of oxygen between 1% and 10% of the storage atmosphere, and a volume of carbon dioxide in the range of about 0.5 to 6 times the volume of oxygen. However, this patent does not disclose what, if any, modified atmosphere would increase the deterioration resistance of lemons upon exposure to air.

Grierson, et al disclose that levels of 5% to 8% gaseous molecular oxygen by volume consistently reduced decay of lemons to less than that in air storage, and that color change in lemons is slowest, and decay highest, in gaseous atmospheres containing 5-8% molecular oxygen and 10% carbon dioxide by volume.

In accordance with this invention, deterioration resistance of citrus fruit such as lemons, grapefruit and oranges to be exposed to air is improved by subjecting them to controlled or modified atmospheres (CA, MA) consisting essentially of certain amounts by volume of carbon dioxide and carbon monoxide, and an amount by volume of oxygen that may be more or less than air normally contains but is preferably less than the amount air normally contains.

Carbon monoxide inhibits the formation of and spread of blue and green mold on citrus fruit such as lemons, grapefruit and oranges, and prevents or inhibits the formation and spread of sour rot lesions on such citrus fruit. Carbon monoxide also inhibits the onset and spread of decay that significant carbon dioxide concentrations in controlled atmospheres for the storage of citrus fruit such as lemons reportedly sometimes causes. Carbon monoxide may also tend to promote some yellowing of partially yellow lemon rind; however, this effect is not deleterious to the lemons so affected.

An effective amount of carbon monoxide means an amount substantially greater than the amount air normally contains. More specifically, an effective amount means an amount in the range of about 1% to about 25%, preferably about 5% to about 15%, by volume, of carbon monoxide in the modified atmosphere.

Carbon dioxide in the controlled and modified atmospheres of this invention promotes the retention of green color in the rind and in the buttons and stylar ends of lemons, and tends to prevent loss of firmness of the lemon flesh and rind. Carbon dioxide also inhibits sporulation of mold and rot. However, the use of carbon dioxide in the concentrations this invention requires has reportedly caused decay of lemons, especially uncured lemons, after retention under such atmospheres for more than three to four weeks. The controlled and modified atmospheres minimize that problem while promoting the desirable effects that carbon monoxide and carbon dioxide each alone produces upon citrus fruit such as lemons, grapefruit and oranges stored in atmospheres containing effective amounts of these gases. Carbon dioxide also appears to maintain the flavor of at least one variety of oranges.

An effective amount of carbon dioxide means an amount substantially greater than the amount air normally contains. More specifically, an effective amount means an amount in the range of about 1% to about 25%. For lemons, the amount is preferably about 5% to about 20%, and more preferably about 10% to about 15% by volume. For oranges, the amount is preferably about 2% to about 10%, more preferably, about 3% to about 6%. For grapefruit, the amount is preferably about 5% to about 15%, more preferably, about 5% to about 7%.

Effective amounts by volume of oxygen in the controlled and modified atmospheres of this invention may be more or less than air normally contains (i.e. 21% by volume) but is preferably less than the amount that air normally contains. Thus, where citrus fruit are first placed in the controlled and modified atmospheres of this invention, the volume of oxygen in that atmosphere may be raised to more than 21% by volume initially. Respiration thereafter reduces the oxygen concentration in the atmosphere.

To insure a minimum oxygen concentration in the controlled and modified atmospheres, the oxygen content may be elevated initially to an amount greater than air normally contains. For example, with lemons, the oxygen concentration may range from about 25% to about 35% by volume of the controlled or modified atmosphere at the outset. Thereafter, the amount preferably will be in the range of about 5% to about 20%. With oranges, the oxygen volume may be in the range of about 5% to about 20%, preferably about 5% to about 15%. With grapefruit, the oxygen volume may be in the range of about 3% to about 15%, preferably about 5% to about 10%. Within the foregoing ranges of carbon monoxide, oxygen and carbon dioxide, the actual amounts of each used will differ depending upon the kind of citrus, the variety of the citrus fruit, whether the fruit is cured or uncured, time of storage and the length of time between harvesting and subjection to the atmospheres of this invention.

During the time periods that citrus fruit such as lemons are subjected to the controlled and modified atmospheres, the citrus fruit and the atmospheres are maintained at temperatures in the range of about 40° to 60° Fahrenheit (F.) and at a relative humidity of about 95% to about 100%. Both the temperature and the relative humidity may vary during any time period the citrus is subjected to these controlled and modified atmospheres, but good results are obtained where the storage temperature is about 45° F. to about 50° F., and the relative humidity, about 95% to about 100%.

Curing is the term used to describe the gradual physical and chemical change which occurs when lemons are placed in air maintained at 58°–60° F., and relative humidity of 85–90%. In the curing process, lemons absorb oxygen and give off carbon dioxide and other gases. These other gases have deleterious effects on the shelf life of lemons. The new controlled and modified atmospheres act to minimize these deleterious effects.

EXAMPLES

I

Five boxes of yellow cured lemons, with each box containing about 165 lemons, were placed in different 55-gallon barrels containing the following controlled and modified atmospheres consisting essentially of, by volume:

A: About 5% carbon dioxide, about 5% oxygen and about 90% nitrogen;
B: About 5% carbon dioxide, about 5% oxygen, about 10% carbon monoxide, and about 80% nitrogen;
C: Substantially no carbon dioxide, about 5% oxygen and about 95% nitrogen;
D. Substantially no carbon dioxide, about 5% oxygen, about 10% carbon monoxide, and about 85% nitrogen; and
E: Air control—about 0.03% carbon dioxide, about 21% oxygen and about 79% nitrogen.

During the period of exposure to these atmospheres, these percentages fluctuated somewhat from day to day, but approximated these percentages during most of the period.

The temperature of the lemons was about 62°–63° F. at the outset, fell to 44°–45° F. after three days of exposure and was maintained at about 45° F. for the balance of the period of exposure, which totaled three weeks. Relative humidity in each of the containers containing atmospheres A, B, C, and D was 95%–100%, and in E was 85%–95% during the three week storage period.

At the end of three weeks, the boxes were opened for inspection. None of the lemons was decayed. The most attractive fruit was that held under atmosphere A. Buttons and stylar ends of these lemons were green, and the lemons were firmer and superior in appearance to lemons exposed to atmosphere E. No rind or internal degradation resulted from exposure to atmosphere A.

Lemons held in atmospheres B and D had more yellow coloration than the lemons held in atmospheres A, C and E. Thus, carbon monoxide appeared to accelerate the curing process, but did not promote degradation of the fruit.

Lemons held in atmosphere C were comparable in firmness and color to lemons exposed to atmosphere E.

Lemons exposed to atmosphere E contained 0.20 parts per million (ppm) ethylene in their container, lemons in atmosphere C had 0.165 ppm ethylene in their container, and lemons stored under atmosphere A had only 0.025 ppm ethylene, which indicates that higher carbon dioxide volumes than contained in air reduced the production of ethylene. (Ethylene is used to cure lemons but has a tendency to spur deterioration of lemons after they are cured.).

These results demonstrate that the addition of effective amounts of carbon monoxide to controlled atmospheres consisting essentially of effective amounts of carbon dioxide and oxygen does not inhibit the desirable effects carbon dioxide produces.

II

Seven groups of lemons, each containing 15 cured yellow lemons, were placed inside separate desiccators. These desiccators contained the following controlled and modified atmospheres consisting essentially of, by volume:

A: About 5% carbon dioxide, about 5% oxygen, and about 90% nitrogen;
B: About 5% carbon dioxide, about 5% oxygen, about 10–20% carbon monoxide, and about 70–80% nitrogen;
C: About 10% carbon dioxide, about 5% molecular oxygen, and about 85% nitrogen;
D: About 10% carbon dioxide, about 5% oxygen, about 15 to about 20% carbon monoxide, and about 65 to about 70% nitrogen;
E: Substantially no carbon dioxide, about 5% oxygen and about 95% nitrogen;
F: Substantially no carbon dioxide, about 5% oxygen, about 20% carbon monoxide, and about 75% nitrogen; and
G: Air control—about 0.03% carbon dioxide, about 21% oxygen, and about 79% nitrogen.

During the period of exposure to these atmospheres, these percentages fluctuated from day to day, but approximated these percentages during most of the storage period.

The temperature of the lemons was about 62°–63° F. at the outset, fell to 45° after three days of exposure, and was maintained at about 44°–45° F. for the balance of the period of exposure, which totaled 18 days. In the containers holding atmospheres A through F, the relative humidity was substantially 95%–100% throughout the storage period, while in the container holding the air control, the relative humidity was in the range 85%–95% throughout the storage period.

After 18 days in these atmospheres, the results were as follows:

1. The lemons held under atmosphere C had the best appearance, were firmest and had more green at the buttons and stylar ends than lemons held under the other atmospheres;
2. Lemons held under atmosphere B were nearly as firm as those held under atmosphere C but had less green at the buttons and stylar ends;
3. Lemons held under atmospheres G and E were less firm and had less green at the buttons and stylar ends than did the lemons held under atmospheres C and A;
4. Lemons held under atmospheres B, D and F produced results comparable to those lemons held under atmospheres A, C and E, respectively, but had less green at the buttons and stylar ends;
5. Gas samples taken after ten days of the eighteen day storage period from desiccators containing atmospheres A and E showed ethylene concentrations of 0.025 ppm and 0.105 ppm, respectively, proving that about 5% carbon dioxide in the atmosphere reduces the concentration of ethylene; and 6. None of the lemons held under controlled atmospheres A through F showed any decay. Again, the desirable effects carbon dioxide and carbon monoxide each alone produces are not diminished by the use of these two gases together in controlled atmospheres for storage of lemons.

III

Four boxes of uncured yellow lemons, with each box containing 100 or more lemons, were placed in separate barrels containing controlled and modified atmospheres, and held for five weeks a a temperature of about 48° F., and relative humidity of about 100%. These atmospheres consisted essentially of, by volume:

- A: Substantially no carbon dioxide, about 5% oxygen and about 95% nitrogen;
- B: About 5% carbon dioxide, about 5% oxygen, and about 90% nitrogen;
- C: About 10% carbon dioxide, about 5% oxygen, and about 85% nitrogen;
- D: Air control—about 0.03% carbon dioxide, about 21% oxygen, and about 79% nitrogen. The air control was exposed to ambient air at 48° F. and 80–85% relative humidity for the same five week period. Results were as follows:

TABLE 1

| ATMOS-PHERE | UPON FIRST EXPOSURE TO AMBIENT CONDITIONS | | |
|---|---|---|---|
| | NO. OF LEMONS | TOTAL NUMBER OF DECAYED LEMONS | % OF DECAYED LEMONS |
| A | 184 | 5 | 2.7 |
| B | 150 | 8 | 6.0 |
| C | 100 | 11 | 11.0 |
| D | 129 | 5 | 4.0 |

TABLE 2

| ATMOS-PHERE | AFTER TEN DAYS EXPOSURE TO AMBIENT CONDITIONS | | |
|---|---|---|---|
| | No. OF LEMONS | TOTAL NUMBER OF DECAYED LEMONS | % OF DECAYED LEMONS |
| A | 184 | 21 | 11.4 |
| B | 150 | 51 | 34.0 |
| C | 100 | 48 | 48.0 |
| D | 129 | 19 | 14.7 |

Lemons held in atmospheres B and C had the best appearance, the greatest area of green color at the button and stylar ends, and were firmest. Lemons held in atmosphere D were poorest in appearance, least firm, and had the least green area at the button and stylar ends. Lemons held under atmosphere A had qualities that were better than those held under atmosphere D, but were not as good as those held under atmospheres B and C, indicating that carbon dioxide in controlled and modified atmospheres helps maintain the physiological characteristics of the lemons even though carbon dioxide may promote the attack on the lemons by mold and sour rot.

These results demonstrate that controlled and modified atmospheres for the storage of lemons consisting essentially of effective amounts of carbon dioxide, and less oxygen than air normally contains may cause increased decay from mold and rot of lemons, especially uncured lemons, after extended storage periods. Addition of carbon monoxide to such atmospheres in accordance with this invention minimizes this problem.

IV

Eight groups of uncured, full yellow lemons, each group containing 8 lemons, were placed in separate desiccators containing controlled and modified atmospheres, consisting essentially of, by volume:

- A and B: About 5% carbon dioxide, about 10% oxygen, and the balance nitrogen;
- C and D: About 5% carbon dioxide, about 10% oxygen, and about 10% to 20% carbon monoxide, and the balance nitrogen;
- E and F: About 10% oxygen, about 10% to about 20% carbon monoxide, no carbon dioxide and the balance nitrogen; and
- G and H: Air control: About 0.3% carbon dioxide, about 21% oxygen and about 79% nitrogen.

The lemons placed under atmospheres A, C, E and G were injected with the sour rot organism Geotrichum candidum by injecting one milliliter of a suspension of this organism under the lemon rind with a syringe. The lemon groups placed under controlled atmospheres B, D, F and H were scratched at their equator to form a wound one millimeter deep and one centimeter long, which was brushed with a concentrated spore suspension of the blue and green mold organisms *Penicillium italicum* and *Penicillium digitatum*. All controlled atmospheres were held at 45° F. and at about 100% relative humidity. After three weeks the lemons inoculated with sour rot were evaluated. All of the lemons had some sour rot infection. However, those lemons held under atmospheres C and E containing carbon monoxide had significantly smaller rot lesions, indicating a marked inhibitory effect. Lemons held in atmosphere A had an average decayed area of about 41.7 square centimeters; lemons held under atmosphere C, had an average of 11.8 square centimeters; lemons held under atmosphere E had an average affected area of 8.3 square centimeters, and lemons held under atmosphere G had an average of 53.6 square centimeters.

After 26 days of storage under atmospheres B, D, F and H, lemons inoculated with the blue and green mold suspension were evaluated. All lemons held in air were infected with blue and green mold, and sporulation was heavy. Five of the eight lemons from atmosphere H were completely covered with mold spores, and the other three lemons under H were about 50% covered. Six of the eight lemons held in atmosphere B were infected, but sporulation of the mold was inhibited. White mycelia covered about 50% of the six infected lemons. Lemons held in atmospheres D and F were completely free of infection.

Lemons held under atmospheres C and D exhibited the best combination of physiological properties, including a high percentage of green at buttons and stylar ends, and firm rind and flesh, and resistance to sour rot organisms and blue and green mold organisms, which shows that the compositions of this invention effectively produce the desirable effects that effective amounts of carbon dioxide and carbon monoxide alone can produce.

V

Six groups of fully cured yellow lemons, each group containing eight lemons, were placed in separate desiccators containing controlled atmospheres consisting essentially of, by volume:

A: About 25% to about 15% oxygen, about 15% to about 10% carbon monoxide, no carbon dioxide, and the balance nitrogen;

B: About 23% to about 10% oxygen, about 15% to about 10% carbon monoxide, no carbon dioxide, and the balance nitrogen;

C: About 21% to about 16% oxygen, about 19% to about 10% carbon monoxide, no carbon dioxide, and the balance nitrogen; and D, E and F: Air controls—0.3% carbon dioxide, about 21% oxygen and about 79% nitrogen.

During the period of exposure to these atmospheres, these percentages fluctuated from day to day, but approximated these percentages during most of the storage period.

Before placing the lemons in the controlled atmospheres, a scratch one millimeter deep and one centimeter long was made at the equator of each lemon, and the sour rot organism *Geotrichum candidum* was brushed onto the scratch.

The lemons held under atmospheres A, B, and C were maintained at 48° F. and approximately 100% relative humidity for the two week period. Those held under air, namely D, E, and F, were maintained at 48° F. and 85%–95% relative humidity for the same period. At the end of this period, it was observed that each of atmospheres A, B and C prevented the formation of sour rot lesions on all but one lemon each in the groups held under atmospheres A and B, and all but two lemons in the group held under atmosphere C. Lemons held under air control atmospheres D, E and F all exhibited sour rot lesions over a substantial portion of the surface of each lemon. On average, 23.9 square centimeters, 29.3 square centimeters, and 56.6 square centimeters of the lemons held under atmospheres D, E, and F, respectively, were affected while only 0.16, 0.16 and 0.46 square centimeters of the lemons held under atmospheres A, B and C, respectively, exhibited such deterioration.

These results demonstrate the powerful inhibitory effects that controlled atmospheres consisting essentially of smaller amounts by volume of oxygen than air contains and greater amounts by volume of carbon monoxide than air contains exert upon the attack of sour rot on lemons stored under such atmospheres. The physiological condition of lemons held under atmospheres A, B and C was approximately the same, indicating that variations in the carbon monoxide content of the atmospheres does not affect such properties.

VI

Nine boxes of navel oranges, each box containing 88 oranges, were cooled to 42° F., and then each box was placed in a separate container. In eight of the containers, the atmosphere was modified to alter the percentage by volume, of carbon dioxide, oxygen, and carbon monoxide from the amounts air normally contains. In the ninth container, no modification of atmosphere was made; normal air was maintained in the container throughout the test.

After the atmosphere in each container was modified, the containers were maintained as near to the desired atmosphere as possible for seven weeks at temperatures in the range of about 42° to about 45° F. Thereafter, the oranges were removed from their containers, and evaluated visually for decay and physiological disorder. The flavor of samples from each group was also tested. The results of the evaluation for decay and soilage is set forth in this table

| Con-tainer No. | Atmosphere % by volume[1,2] | | | Total No. Oranges | Number with | | Percent | |
|---|---|---|---|---|---|---|---|---|
| | $CO_2$ | $O_2$ | CO | | Decay | Soilage | Decay | Soilage |
| 1 | 0 | 15 | 10 | 88 | 4 | 0 | 4.5 | 0 |
| 2 | 0 | 15 | 0 | 88 | 2 | 6 | 2.2 | 6.8 |
| 3 | 3 | 15 | 10 | 88 | 0 | 0 | 0 | 0 |
| 4 | 3 | 15 | 0 | 88 | 4 | 0 | 4.5 | 0 |
| 5 | 0 | 5 | 10 | 88 | 0 | 0 | 0 | 0 |
| 6 | 0 | 5 | 0 | 88 | 0 | 0 | 0 | 0 |
| 7 | 3 | 5 | 10 | 88 | 2 | 0 | 2.2 | 0 |
| 8 | 3 | 5 | 0 | 88 | 13 | 0 | 14.7 | 0 |
| 9 | Air Control | | | 88 | 11 | 3 | 12.5 | 3.4 |

[1] percentages varied somewhat from these values during 7-week period because of difficulties in sealing containers and because of respiration of the fruit.
[2] balance of each atmosphere was molecular nitrogen No physiological disorders were evident from visual examination of the oranges held in the modified atmospheres. Oranges held in the higher oxygen concentrations without carbon dioxide were not as tasty as oranges held in high oxygen treatments with carbon dioxide. Oranges held in the lower oxygen concentrations had a slight, but not unacceptable off flavor. Carbon monoxide neither enhanced nor damaged flavor. However, carbon monoxide appeared more effective as a fungistat where carbon dioxide was also present in the atmosphere.

After the oranges were removed from the modified atmospheres, they were held at about 55° F. to about 65° F. in air for an additional week and evaluated again for decay and spoilage. Results were as follows:

| Container No. | Total No. Oranges | Number with | | Percent: | |
|---|---|---|---|---|---|
| | | Decay | Soilage | Decay | Soilage |
| 1 | 88 | 4 | 0 | 4.5 | 0 |
| 2 | 88 | 2 | 6 | 2.2 | 6.8 |
| 3 | 88 | 0 | 0 | 0 | 0 |
| 4 | 88 | 5 | 0 | 5.7 | 0 |
| 5 | 88 | 0 | 0 | 0 | 0 |
| 6 | 88 | 3 | 0 | 3.4 | 0 |
| 7 | 88 | 2 | 0 | 2.2 | 0 |
| 8 | 88 | 13 | 0 | 14.7 | 0 |
| Air Control | 88 | 12 | 9 | 13.6 | 10.0 |

During the one-week period reported in this Table there was some increase in decay in the oranges that were not subjected to carbon monoxide, but none in the oranges subjected to carbon monoxide.

VII

Two groups of 140 lemons each were placed in separate containers. Each group had been initially immersed in a spore suspension of blue-green mold and sour rot organisms. The atmosphere in container 1 was modified to contain about 10% carbon dioxide, about 5% oxygen, and about 5% to about 10% carbon monoxide, with the balance substantially all molecular nitrogen during the test period. The atmosphere in container 2 was air throughout the test. The temperature in each container was modified to and held at about 40° F. for the first eighteen days, and then at about 55° F. for the next nine days.

After the 27-day period, no decay was present in either group. Lemons held in the modified atmosphere had much greater retention of green color in their rinds than did the air control lemons. Carbon monoxide did not adversely affect the yellow lemon color.

After removal from the containers, the lemon groups were held at about 55° F. to about 65° F. for nine days. Lemons held in the modified atmosphere were still firm exhibited considerable green color, and buttons remained green and firmly attached. No decay developed in these lemons. Lemons held in air were softer and full yellow in color. Four of these lemons developed decay.

This example illustrates that the tendency of carbon monoxide to change the color of lemons from yellow to orange can be inhibited by appropriate adjustment of the carbon dioxide and oxygen concentrations in the modified atmosphere.

What is claimed is:

1. A method for inhibiting fungi in citrus fruit comprising subjecting said citrus fruit to a controlled or modified atmosphere effective for inhibiting said fungi that includes by volume, about 1% to about 25% carbon monoxide, about 1% to about 25% carbon dioxide, from about 3% to less than about 21% oxygen, and the balance substantially all nitrogen.

2. The method of claim 1 wherein the cirtus fruit are lemons, and the controlled or modified atmosphere includes by volume, about 5% to about 15% carbon monoxide, about 5% to about 20% carbon dioxide, about 5% to about 20% oxygen, and the balance substantially all nitrogen.

3. The method of claim 2 wherein the controlled or modified atmosphere includes by volume, about 5% to about 15% carbon monoxide, about 10% to about 15% carbon dioxide, about 5% to about 20% oxygen, and the balance substantially all nitrogen.

4. The method of claim 3 wherein the controlled or modified atmosphere is maintained at a temperature in the range of about 40° F. to about 60° F., and the relative humidity of the controlled or modified atmosphere is maintained at about 95% to about 100%.

5. The method of claim 1 wherein the citrus fruit are oranges and wherein the controlled or modified atmosphere includes by volume, about 1% to about 25% carbon monoxide, about 2% to about 10% carbon dioxide, from about 3% to less than about 21% oxygen and the balance substantially all nitrogen.

6. The method of claim 1 wherein the citrus fruit are grapefruit, and the controlled or modified atmosphere includes by volume, about 1% to about 25% carbon monoxide, about 5% to about 15% carbon dioxide, from about 3% to less than about 21% oxygen and the balance substantially all nitrogen.

* * * * *